April 25, 1950 G. GLASS 2,505,615
HAND MIRROR
Filed April 30, 1946
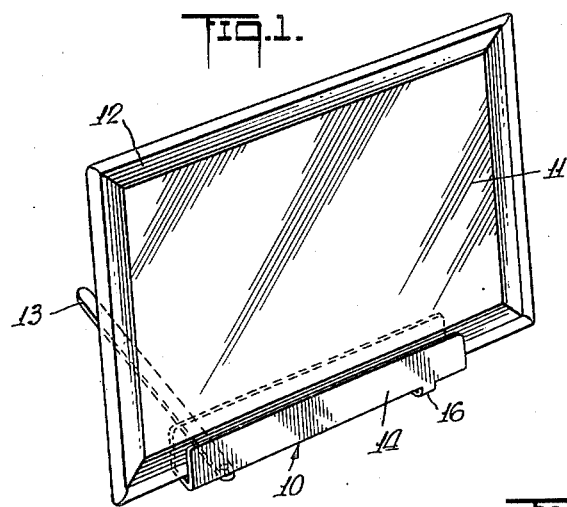
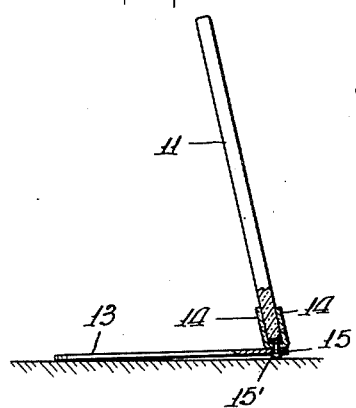
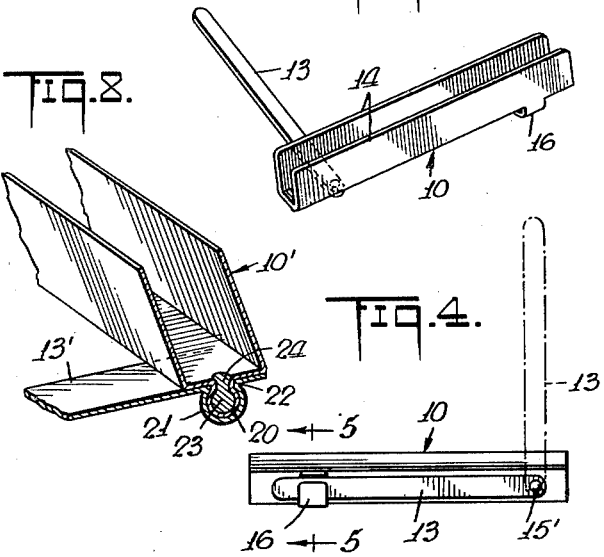
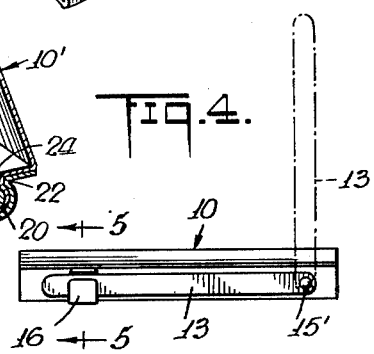
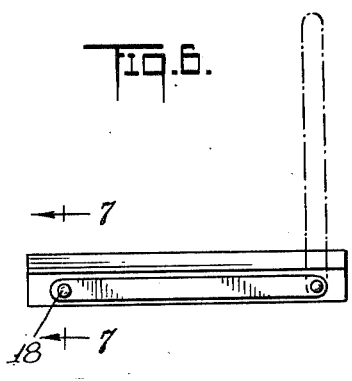
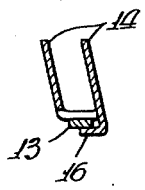
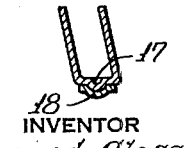
INVENTOR
*Gerard Glass*
BY
*Dean Fairbank & Hirsch*
ATTORNEYS Patented Apr. 25, 1950

2,505,615

UNITED STATES PATENT OFFICE 2,505,615

HAND MIRROR

Gerard Glass, Geneva, Switzerland

Application April 30, 1946, Serial No. 665,940

3 Claims. (Cl. 248—37)

The present invention relates to hand mirrors and more especially to small mirrors of the type used in ladies' handbags.

It is among the objects of the invention to provide a mirror of the above type of simple, inexpensive and rugged construction which has self-contained easel means for supporting the mirror upon a table at appropriate inclination from upright position and which when carried in the handbag is and remains substantially flat and free from projections.

In the accompanying drawings in which are shown one or more of various possible embodiments of the several features of the invention:

Fig. 1 is a perspective view of one embodiment of the invention showing the mirror in use with its easel in operative position, Fig. 2 is an end view thereof, Fig. 3 is a perspective view of the channel bracket and easel unit, Fig. 4 is a bottom plan thereof, Fig. 5 is a transverse sectional view of a detail taken on line 5—5 of Fig. 4, Fig. 6 is a view similar to Fig. 4 of a modification, Fig. 7 is a transverse sectional view of a detail taken on line 7—7 of Fig. 6, and Fig. 8 is a fragmentary perspective view partly in section of a further embodiment.

Referring now to the drawings the device involves preferably a metallic channel bracket 10 for retaining the lower rim of a small mirror plate 11 preferably rectangular in shape. The mirror plate may be of the conventional type carried as an accessory in ladies' handbags, although the invention is also applicable to somewhat larger mirrors carried in mens' toilet kits and used for shaving, as well as for other purposes which are evident. The mirror may be plain or have an edge binding 12 such as suggested in Fig. 1. The mirror may be frictionally clamped in the channel bracket or permanently secured therein as desired.

According to the invention, the channel bracket has associated therewith an easel, desirably a bar 13 preferably hinged thereto and retained against and along the base of the bracket when the device is in inactive position, but readily pivoted rearwardly at an inclination as best shown in Figs. 1 to 4 to aid in supporting the mirror upon a table for use. The parallel jaws 14 of the channel bracket are preferably inclined as shown so that the easel bar, when extended as best shown in Fig. 2 will position the mirror at the desired slight inclination to the vertical.

The easel bar may be mounted on the channel bracket in any of a number of manners, a few of which are shown in the drawings. In the embodiment of Figs. 1 to 4 a pin 15 through the base of the channel bracket near one end thereof extends through the easel bar near one end of the latter and is headed as at 15' to serve as the pivot for the easel bar. To limit the return movement of the easel bar to registry along the channel bracket, the latter has a transverse tongue 16 stamped therefrom with its end parallel to the width of said channel base as shown, to accommodate the easel bar 13 in idle position as best shown in Figs. 4 and 5. Accordingly, when the device is carried in the handbag there is no likelihood of the easel bar being displaced from collapsed or idle position.

If desired, instead of the transverse stop tongue 16, the channel bracket may be provided with an embossment or boss 17 near its free end to snap into a corresponding depression 18 in the easel bar near the corresponding end of the latter for impositively holding the easel bar in inactive position.

In Fig. 8 is shown a modified arrangement for pivoting the easel bar in place. In this relation the channel bracket 10' is provided with an embossed depression 20 circular in cross section and near one end thereof, and the easel bar with a corresponding embossment socket 21 which envelopes embossment 20. By forcing the necks of the registering embossments of the two parts inward with an appropriate tool, as indicated at 22, it will immediately be seen that the parts remain hinged together.

Preferably a short stud 23 with a reduced neck 24 is inserted into the inner of the embossments 20, so that the depression of the metal at the neck 22 effects close contact with said stud for a secure assembly of the parts, which nevertheless admits of the ready hinging displacement of the easel bar 13' relative to the channel bracket 10'. As in the other embodiments, the device affords appropriate stop or holding means for retaining the easel bar in inactive position.

It will be understood of course that the pin 15 in the embodiment of Figs. 1 to 5 and the embossment socket 21 in the embodiment of Fig. 8 extend under the base of the channel bracket to the same extent as the stop tongue 16 or boss 17, so that the length of the channel bracket base is supported horizontally upon a flat table.

It will also be understood that the easel bar could be moved outward in use substantially into alignment with the channel bracket to serve as a handle for conveniently holding the mirror for use without obstructing any part of the reflecting surface.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A hand mirror having a horizontal channel support bracket having a base and parallel but obliquely extending side walls, an easel bar pivoted under the base of said bracket and slightly shorter than the length thereof means releasably to retain the easel bar in inactive position along the channel bracket.

2. A hand mirror comprising a channel bracket having a base and parallel but obliquely extending sidewalls, a mirror plate retained therein, said mirror plate being slightly longer than said channel bracket and an easel for resting the mirror on a table at the inclination determined by the sidewalls of said bracket, said easel comprising a bar slightly shorter than the length of the base of said channel bracket, a pin through the base of said bracket, serving as a hinge for said easel bar, and stop means protruding below the bracket to the same extent as the hinge pin and serving to arrest the easel bar in inoperative position along the base of the bracket.

3. In a hand mirror, a channel bracket having a base and parallel but obliquely extending side walls and an easel bar hinged under said base, a mirror plate releasably clamped between said side walls, stop means near one end of said bracket to arrest and limit the return movement of the easel bar for registry along the bracket in idle position said bracket having an embossment near one end thereof generally circular in cross section, an easel bar having a corresponding embossment near one end thereof encompassing the embossment of the bracket and a stud filling the embossment of the bracket and having a reduced neck at the upper end thereof, adjacent the inner face of the bracket face, the metal of both the bracket and easel bar embossment being drawn inward about the neck of the stud to retain the parts in position.

GERARD GLASS.

REFERENCES CITED

The following references are of record in the file of this patent:

UNITED STATES PATENTS

| Number | Name | Date |
|---|---|---|
| 1,040,067 | Washburn | Oct. 1, 1912 |
| 1,124,898 | Heitkam | Jan. 12, 1915 |
| 1,275,662 | Carlsberg | Aug. 13, 1918 |
| 2,049,407 | Clark | July 28, 1936 |
| 2,388,435 | Puerner et al. | Nov. 6, 1945 |

FOREIGN PATENTS

| Number | Country | Date |
|---|---|---|
| 515,806 | Great Britain | Dec. 14, 1939 |